(12) United States Patent
Mistry

(10) Patent No.: US 11,310,035 B2
(45) Date of Patent: Apr. 19, 2022

(54) SECURING DATA AT REST UTILIZING CLOUD PROVIDER SERVICE AGNOSTIC ENCRYPTED DATA TRANSPORTABILITY

(71) Applicant: Google LLC, Mountain View, CA (US)

(72) Inventor: Shaunak Mistry, Scotts Valley, CA (US)

(73) Assignee: Google LLC, Mountain View, CA (US)

( * ) Notice: Subject to any disclaimer, the term of this patent is extended or adjusted under 35 U.S.C. 154(b) by 279 days.

(21) Appl. No.: 16/223,622

(22) Filed: Dec. 18, 2018

(65) Prior Publication Data

US 2020/0195425 A1    Jun. 18, 2020

(51) Int. Cl.
*H04L 9/08* (2006.01)
*H04L 9/32* (2006.01)
*H04L 29/06* (2006.01)

(52) U.S. Cl.
CPC ............ *H04L 9/0822* (2013.01); *H04L 9/083* (2013.01); *H04L 9/0869* (2013.01); *H04L 9/0894* (2013.01); *H04L 9/3242* (2013.01); *H04L 63/0478* (2013.01)

(58) Field of Classification Search
CPC ..... H04L 9/0822; H04L 9/083; H04L 9/0869; H04L 9/0894; H04L 9/3242; H04L 63/0478
See application file for complete search history.

(56) References Cited

U.S. PATENT DOCUMENTS 5,673,316 A * 9/1997 Auerbach ................. G07F 7/08
705/51
9,973,481 B1 * 5/2018 Sharifi Mehr ........ H04L 9/0825
(Continued)

OTHER PUBLICATIONS

Nishika, Rahul Kumar Yadav. "A Lookup Table Based Secure Cryptographic SMS Communication on Android Environment." p. 9. (2013) (Year: 2013).*

(Continued)

*Primary Examiner* — Jeremy S Duffield
*Assistant Examiner* — Zhe Liu
(74) *Attorney, Agent, or Firm* — Honigman LLP; Brett A. Krueger

(57) ABSTRACT

Securing at rest data on a cloud hosted server includes, for each cloud hosted instance of a computer program, creating a key encrypted key (KEK) using a unique customer master key (CMK) corresponding to the instance, but only an encrypted form of the KEK is persisted in a database for the corresponding instance whereas the unencrypted KEK is retained in memory of the encryption process only. Thereafter, in response to a request to persist data by a corresponding instance of the computer program, a data key (DK) is randomly generated and encrypted with the KEK in memory for the corresponding instance. The data itself also is encrypted with the DK and an envelope with the encrypted DK and the encrypted data returned to the requestor, thus ensuring that the data and the encryption keys are never moved or persisted in an un-encrypted form.

15 Claims, 4 Drawing Sheets

(56) References Cited

U.S. PATENT DOCUMENTS

| | | | |
|---|---|---|---|
| 10,491,576 B1* | 11/2019 | Pfannenschmidt | H04L 63/061 |
| 10,623,186 B1* | 4/2020 | Mehr | H04L 9/3226 |
| 10,872,152 B1* | 12/2020 | Martel | G06F 21/31 |
| 2004/0146164 A1* | 7/2004 | Jonas | H04L 9/0822 |
| | | | 380/284 |
| 2009/0006851 A1* | 1/2009 | Freeman | H04L 63/126 |
| | | | 713/170 |
| 2009/0214044 A1* | 8/2009 | Kinoshita | G06F 21/602 |
| | | | 380/283 |
| 2011/0252233 A1* | 10/2011 | De Atley | H04L 9/0894 |
| | | | 713/165 |
| 2018/0048464 A1* | 2/2018 | Lim | H04L 63/061 |
| 2018/0062835 A1* | 3/2018 | Hamel | H04L 9/0894 |
| 2019/0173674 A1* | 6/2019 | Agarwal | H04L 9/0894 |
| 2019/0340393 A1* | 11/2019 | Mo | G06F 21/602 |
| 2019/0370483 A1* | 12/2019 | Sun | H04L 63/0435 |
| 2020/0053065 A1* | 2/2020 | Wisniewski | H04L 9/0822 |
| 2020/0057859 A1* | 2/2020 | Richards | G06F 21/62 |

OTHER PUBLICATIONS

Encryption Key Management in the AWS Cloud. White Paper [online]. Townsend Security. 2017 [retrieved on Dec. 21, 2021]. Retrieved from the Internet <URL: https://www.townsendsecurity.com/sites/default/files/2017-02/AWS-KMS-Competitive.pdf> (Year: 2017).*

Controlling Your Data Using Customer Key. Security Compliance Article. Microsoft Corporation. May 17, 2019 [retrieved on Dec. 21, 2021]. Retrieved from the Internet <URL: https://github.com/microsoftdocs/officedocs-o365seccomp/blob/public/SecurityCompliance/controlling-your-data-using-customer-key.md> (Year: 2019).*

CMK: What Architects Need to Know. White Paper [online]. IronCore Labs. 2019 [retrieved on Dec. 21, 2021]. Retrieved from the Internet <URL: https://ironcorelabs.com/pdf/ironcore-cmk-what-architects-need-to-know.pdf> (Year: 2019).*

Bacis, et al. EncSwift and Key Management: An Integrated Approach in an Industrial Setting. Oct. 2017. 2017 IEEE Conference on Communications and Network Security. pp. 483-486. (Year: 2017).*

* cited by examiner

SECURING DATA AT REST UTILIZING CLOUD PROVIDER SERVICE AGNOSTIC ENCRYPTED DATA TRANSPORTABILITY

BACKGROUND OF THE INVENTION

Field of the Invention

The present invention relates to the field of data security and more particularly to securing data at rest in a data processing system.

Description of the Related Art

In the field of data processing, data at rest refers to inactive data stored physically in any digital form including within a database, data warehouse, document including a spreadsheet, or digital archive or other persistent memory including that found within a mobile device. Data at rest may be compared to data in use and data in transit, thus defining three understood states of digital data. Like data in transit and data in use, data at rest also must be secured for view by unauthorized entities. To that end, data encryption is commonly used to protect data at rest. General encryption techniques employed for data at rest include strong encryption methods such as advanced encryption standard (AES) or Rivest-Shamir-Adleman (RSA) and ensure that encrypted data remains encrypted when access controls such as usernames and password fail. Generally, cryptography is implemented on the database housing the data and on the physical storage where the databases are stored with data encryption keys updated on a regular basis while stored separately from the data.

General encryption of data at rest is not without its challenges. In this regard, encryption of data at rest provides little protection against intrusions in which a malevolent actor gains remote privileged access to a running server in which the passphrase has already been entered. As well, if the applications that access the encrypted files or databases are not themselves secured, a malevolent actor penetrating one of the applications may then gain access to the data, whether encrypted or not. Even further, when full-disk encryption is enabled on a physical server, human intervention is required to manually input a passphrase into a console at time of startup. For database-level encryption, the passphrase must be entered at time of database startup. Thus, data security for data at rest requires more than mere encryption in place.

BRIEF SUMMARY OF THE INVENTION

Embodiments of the present invention address deficiencies of the art in respect to the securing of data at rest and provide a novel and non-obvious method, system and computer program product for persisting data at rest in encrypted form. The securing of data at rest in accordance with one aspect of the embodiment involves an initial configuration of an encrypted key encryption key for a specific instance of a computer program hosted in the cloud, followed by an encryption of data coming to rest and then a decryption of the encrypted data upon recall of the data. As such, in one aspect of the embodiment, during an initial configuration, a customer master key (CMK) for a corresponding instance of a computer program executing remotely over a computer communications network, is received in memory of a computer from over the computer communications network by an encryption process. In response, the encryption process transmits the CMK over the computer communications network to a key management service (KMS) separate from the encryption process, as part of a request for a key encryption key (KEK). In return, the encryption process receives from the KMS both the requested KEK and also an encrypted form of the KEK (EKEK). Finally, the encryption process stores EKEK in a database for the instance of the computer program.

Thereafter, the encryption process receives from the instance of the computer program, unencrypted data to be stored in a database for the instance of the computer program. In response to the receipt of the data, the encryption process generates a data key (DK) using a randomly generated key, encrypts the DK with the KEK, encrypts the received data with the DK, creates an encrypted data envelope with the encrypted DK and the encrypted data, and returns to the instance of the computer program, only the encrypted data envelope without returning the DK. Likewise, upon receiving from the instance of the computer program in the encryption process, a decryption request in respect to the encrypted data envelope, the encryption process splits the encrypted data envelope into the encrypted DK and the encrypted data, retrieves KEK from the database for the instance of the computer program, decrypts the encrypted DK with the retrieved KEK to produce the DK, decrypts the encrypted data with the DK to produce the unencrypted data, and returns to the instance of the computer program, the unencrypted data.

Optionally, the database can be transportable in nature. To that end, the encryption process may generate a transportable backup of the database by receiving from a requestor of a transportable backup, an encrypted form of a database master key (DBMK). The encryption process may then request the KMS to decrypt the encrypted form of the DBMK so as to receive in return, the DBMK. Thereafter, the encryption process subsequently encrypts the KEK with the DBMK (as opposed to the CMK), stores the DBMK encrypted KEK in the database, and returns to the requestor an indication of success, such that the requestor may then create a backup of the database including the DBMK encrypted KEK. Likewise, the transportable backup may be restored by receiving from a restored form of the database the DBMK encrypted KEK, decrypting the DBMK encrypted KEK with the DBMK to produce the KEK, transmitting over the computer communications network to the KMS the CMK as part of a request for a KEK and receiving in response, both the KEK and a CMK encrypted form of the KEK. Finally, the encryption process stores the CMK encrypted KEK in the database, and deletes the DBMK from memory.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the securing of at rest data on a cloud hosted server. In accordance with an embodiment of the invention, for each cloud hosted instance of a computer program, a KEK is created by a KMS using a unique customer master key corresponding to the instance; but, only an encrypted form of the KEK is persisted in a database for the corresponding instance whereas the unencrypted KEK is retained in memory of the encryption process only. Thereafter, in response to a request to persist data by a corresponding instance of the computer program, a DK is randomly generated and encrypted with the KEK in memory for the corresponding instance. The data itself also is encrypted with the DK and an envelope with the encrypted DK and the encrypted data returned to the requestor. Conversely, on decryption, a data envelope is received with encrypted data and an encrypted DK. The KEK in memory for the corresponding instance is then used to decrypt the DK that is then used to decrypt the data for return to the instance of the computer program.

Figure 1:
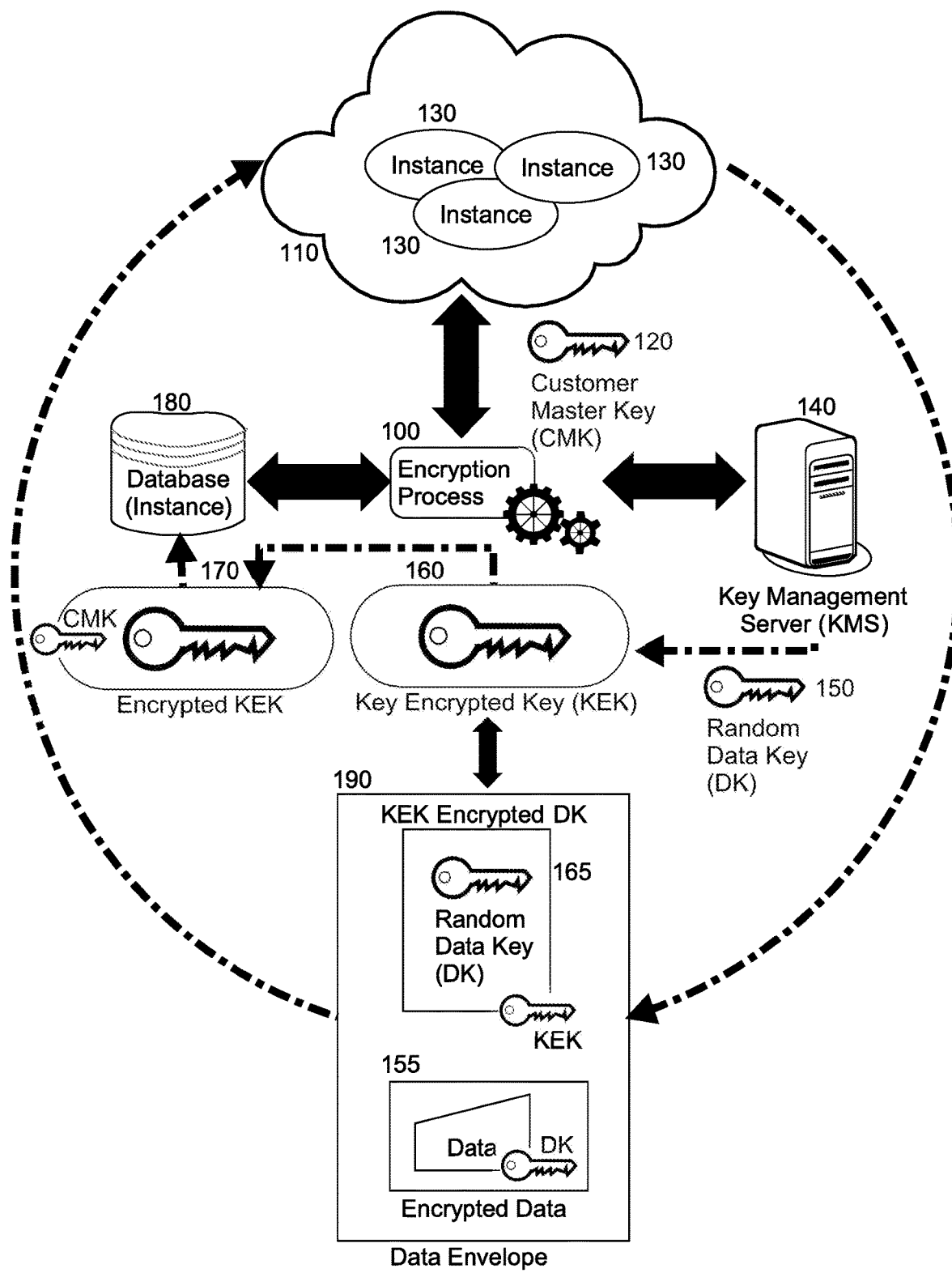
FIG. 1 is pictorial illustration of a process of securing data at rest on a cloud hosted server.

In further illustration, FIG. 1 pictorially illustrates a process of securing data at rest on a cloud hosted server. As shown in FIG. 1, different instances 130 of a computer program execute in hosted cloud environment 110. Each of the instances 130 interacts with one or more corresponding databases 180 (only a single database shown for ease of illustration). An encryption process 100 manages persistence of data from a corresponding one of the instances 130 to the database 180 and the retrieval of data from the database 180. To that end, at the time of instantiation of the corresponding one of the instances 130, a CMK 120 for the corresponding one of the instances 130 is received. The encryption process 100 then communicates with a KMS 140 to generate a KEK 160 which is then encrypted with the CMK 120 to produce CMK encrypted KEK 170. The encryption process 100 then stores the CMK encrypted KEK 170 in the database 180, while maintaining the KEK 160 in memory. However, as it is to be recognized, at any point in time thereafter, the KEK 160 may be recovered with the database 180 providing the CMK encrypted KEK 170 and the CMK 120 so as to decrypt the CMK encrypted KEK 170 into the KEK 160.

In any event, once the CMK encrypted KEK 170 is stored in the database 180, a request to persist data may be received in the encryption process 100 in respect to the database 180. In that event, as data is provided by the corresponding one of the instances 130 for persistence in the database 180, the encryption process 100 encrypts the data with a randomly generated DK 150 provided by KMS 140. As well, the encryption process 100 encrypts the randomly generated DK 150 with the KEK 160 to produce an encrypted DK 165. Finally, the encryption process 100 envelopes both the encrypted DK 165 and the encrypted data 155 in an envelope 190 and returns the envelope 190 to the database 180 for storage therein. Conversely, as a request to retrieve data is received in the encryption process 100, an envelope 190 associated with the request is received and both the KEK encrypted DK 165 and also the DK encrypted data 155 is retrieved from the envelope 190. The KEK 160 accessible by the encryption process 100 then decrypts the KEK encrypted DK 165 so as to produce the DK 150 which then may be used to decrypt the DK encrypted data 155. Finally, the decrypted data may be provided to the requestor.

Figure 2:
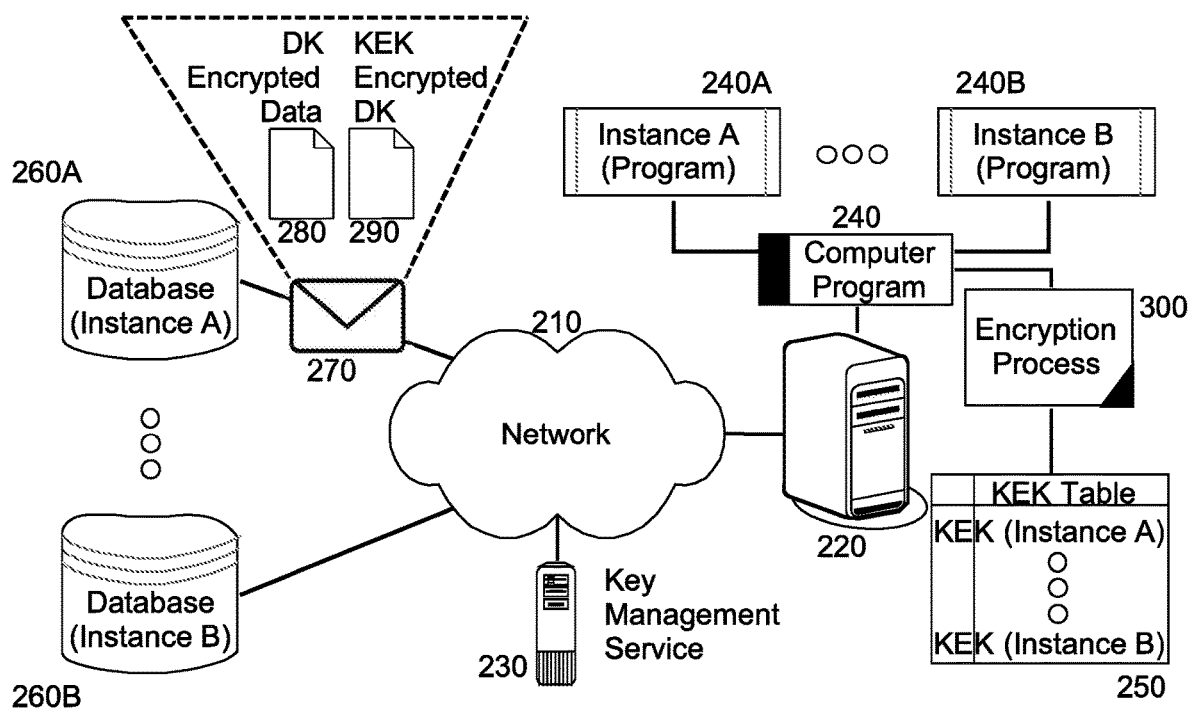
FIG. 2 is a schematic illustration of a data processing system adapted for securing data at rest on a cloud hosted server.

The process set forth in connection with FIG. 1 may be implemented in a data processing system. In further illustration, FIG. 2 schematically shows a data processing system adapted for securing data at rest on a cloud hosted server. The system includes a host computing platform 220 that includes one or more computers, each with memory and at least one processor. The host computing platform 220 supports the execution of multiple different instances 240A, 240B of a computer program 240, each of the instances 240A, 240B accessing data in a corresponding database 260A, 260B from over a computer communications network 210. The host computing platform 220 additionally supports the operation of an encryption process 300.

In this regard, the encryption process 300 includes computer program instructions that when executed by one or more processors of the host computing platform, is operable to perform encryption of data at rest in the databases 260A, 260B, and also decryption of data at rest in the databases 260A, 260B. Specifically, in the course of persisting data to one of the databases 260A, 260B on behalf of a corresponding one of the instances 240A, 240B, the program instructions encrypt the data with a decryption key randomly generated by key management service 230 and provided to the encryption process 300 from over the computer communications network 210. The program instructions additionally encrypt the decryption key with a KEK located in a KEK table 250 and corresponding to the corresponding one of the instances 240A, 240B. Finally, the encrypted data 280 and the KEK encrypted DK 290 are packaged in an envelope 270 and stored in the one of the databases 260A, 260B.

Conversely, the program instructions in the course of retrieving data at rest in one of the databases 260A, 260B on behalf of a corresponding one of the instances 240A, 240B, receives an envelope 270 from the one of the databases 260A, 260B and extracts therefrom, both the DK encrypted data 280 and the KEK encrypted DK. Thereafter, the KEK for the corresponding one of the instances 240A, 240B is determined from the KEK table 250 and used to decrypt the encrypted DK 290. Using the decrypted DK, the program instructions then decrypt the DK encrypted data 280 so as to produce unencrypted data. Finally, the program instructions return the unencrypted data to the corresponding one of the instances 240A, 240B.

Figure 3A:
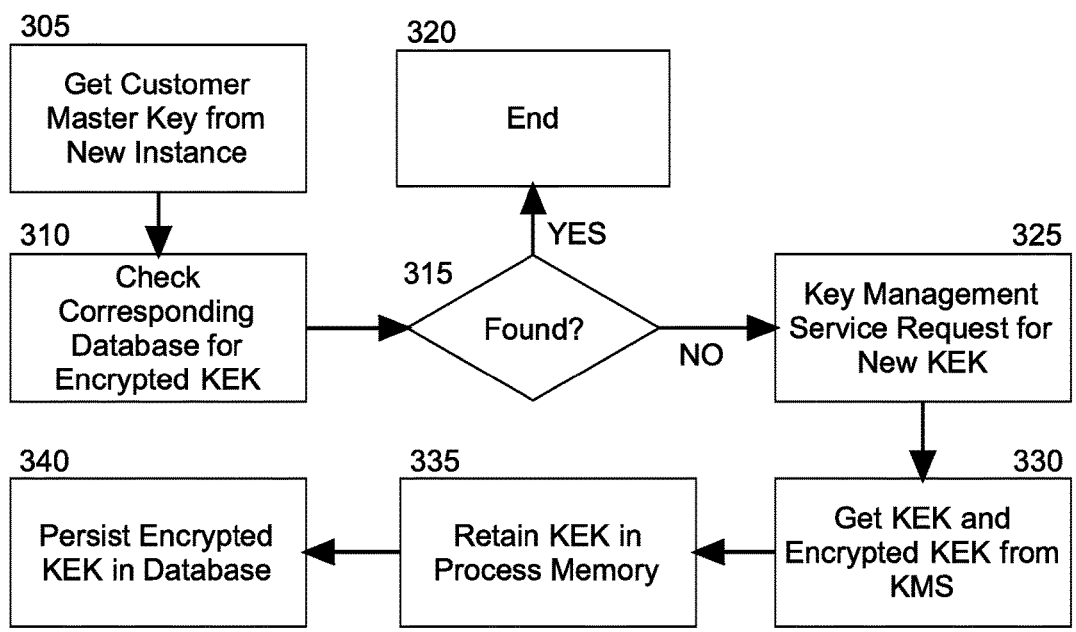
FIG. 3A is a flow chart illustrating a process for generating an encrypted KEK for a new instance of a computer program.

In yet further illustration of the operation of the encryption process 300, FIG. 3A is a flow chart illustrating a process for generating an encrypted KEK for a new instance of a computer program. Beginning in block 305, a CMK is received for a new instance of a computer program hosted within a cloud-based host, which is unique from all other instances of the same computer program executing in the cloud-based host. In block 310, a corresponding database is checked for an encrypted KEK associated with the new instance. In block 315, if an encrypted KEK is found for the new instance, the process ends in block 320. Otherwise, in block 325, a new KEK is requested of the KMS and in block 330, the KMS returns both the requested KEK and also KEK encrypted with the CMK provided to the KMS on behalf of the new instance. Then, in block 335 the KEK is retained in memory of the encryption process, while an encrypted form of the KEK is persisted in the corresponding database.

Figure 3B:
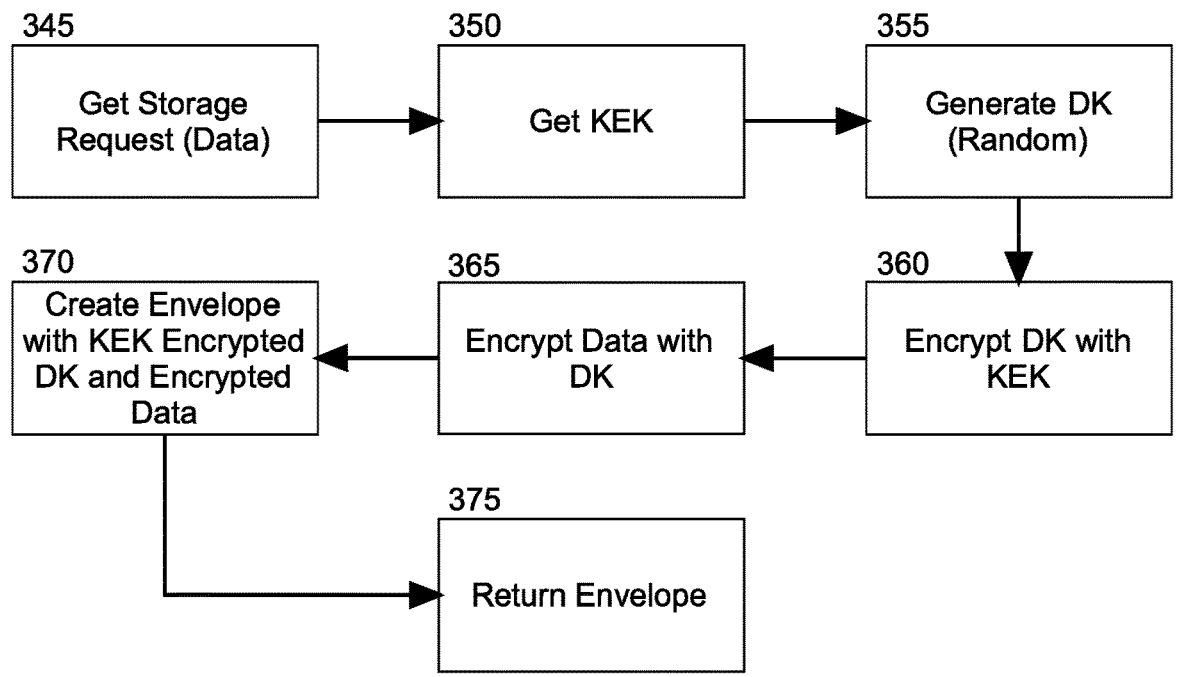
FIG. 3B is a flow chart illustrating a process for encrypting data using the KEK of FIG. 3A.

Turning now to FIG. 3B, a flow chart is provided which illustrates a process for encrypting data using the KEK of FIG. 3A. Beginning in block 345, a storage request is received data and in block 350, a KEK is retrieved for the instance of the computer program associated with the request. In block 355, a DK is generated randomly by the KMS and in block 360 the DK is encrypted with the KEK while in block 365 the DK is used to encrypt the data of the request. Then, in block 370, an envelope is created to include both the KEK encrypted DK and also the DK encrypted data. As well, the envelope may include a hash message authentication code (HMAC) and an identifier of an associated KEK. Finally, in block 375, the envelope is returned to the database for storage so that while the data is at rest in the database, both the data and the key necessary to decrypt the data both remain encrypted and thus secure.

Figure 3C:
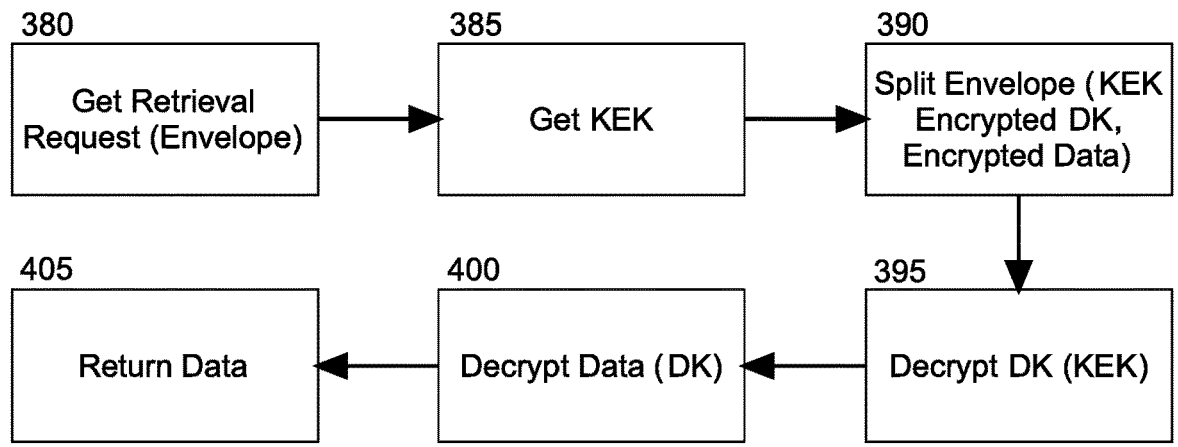
FIG. 3C is a flow chart illustrating a process for decrypting data using the KEK of FIG. 3A.

Turning now to FIG. 3C, a flow chart is provided which illustrates a process for decrypting data using the KEK of FIG. 3A. Beginning in block 380, a retrieval request is received in respect to an envelope stored in a corresponding database. In block 385, a KEK is determined for an instance of the computer program corresponding to the database, for instance in reference to the KEK identifier included as part of the envelope. Optionally, the envelope then may be validated. Thereafter, in block 390, the envelope is split into a KEK encrypted DK and also the encrypted data. In block 395, the DK is decrypted using the KEK while in block 400, the data is then decrypted using the decrypted DK. Finally, in block 405 the decrypted data is returned to the instance of the computer program corresponding to the database.

Figure 4A:
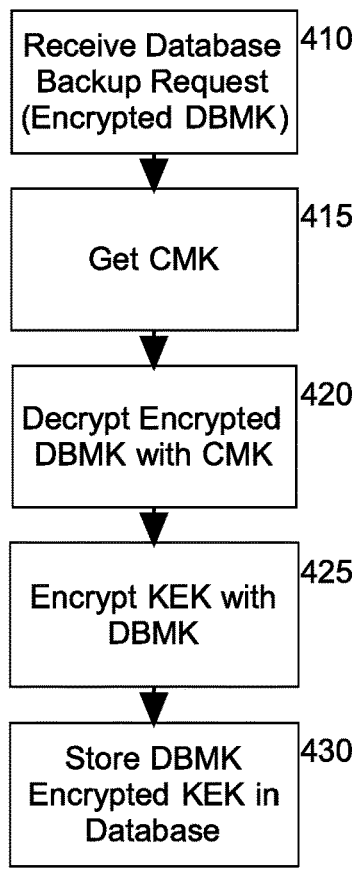
FIG. 4A is flow chart illustrating a process for generating a transportable backup with the KEK of FIG. 3A.

Notably, each of the databases correspondent to one of the instances of the computer program executing in the cloud-host may be encrypted for transport and later restored. In even yet further illustration, FIG. 4A is flow chart illustrating a process for generating a transportable backup with the KEK of FIG. 3A. Beginning in block 410, a database backup request may be received in connection with an encrypted database master key for a database associated with a corresponding one of the instances of the computer program executing in the cloud-host. In block 415, a CMK for the corresponding one of the instances is determined and in block 420, the encrypted database master key is decrypted with the CMK. Subsequently, in block 425 the KEK for the corresponding one of the instances of the computer program is encrypted with the now decrypted database master key. Finally, in block 430 the database master key encrypted KEK is stored in the database.

Figure 4B:
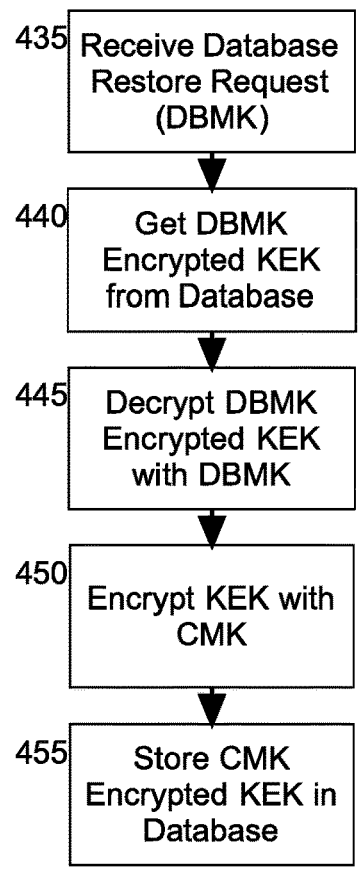
FIG. 4B is a flow chart illustrating a process for restoring the transportable backup with the KEK of FIG. 3A; and, FIG. 5 is a flow chart illustrating a process for validating an enveloped KEK.

Turning now to FIG. 4B, a process is shown for restoring the transported backup of the database. Beginning in block 435, a database restore request is received in connection with a database corresponding to one of the instances of the computer program hosted in the cloud-host. The request may include a DBMK or a network reference to a location from which the DBMK can be retrieved. In block 440, a DBMK encrypted KEK is retrieved from the database and decrypted with the DBMK provided in association with the request. Then, in block 445, the DBMK encrypted KEK is decrypted with the DBMK to produce the KEK. In block 450, the KEK in turn is then encrypted with a CMK for the corresponding one of the instances of the computer program. Finally, in block 455 the CMK encrypted KEK is stored in the database.

Figure 5:
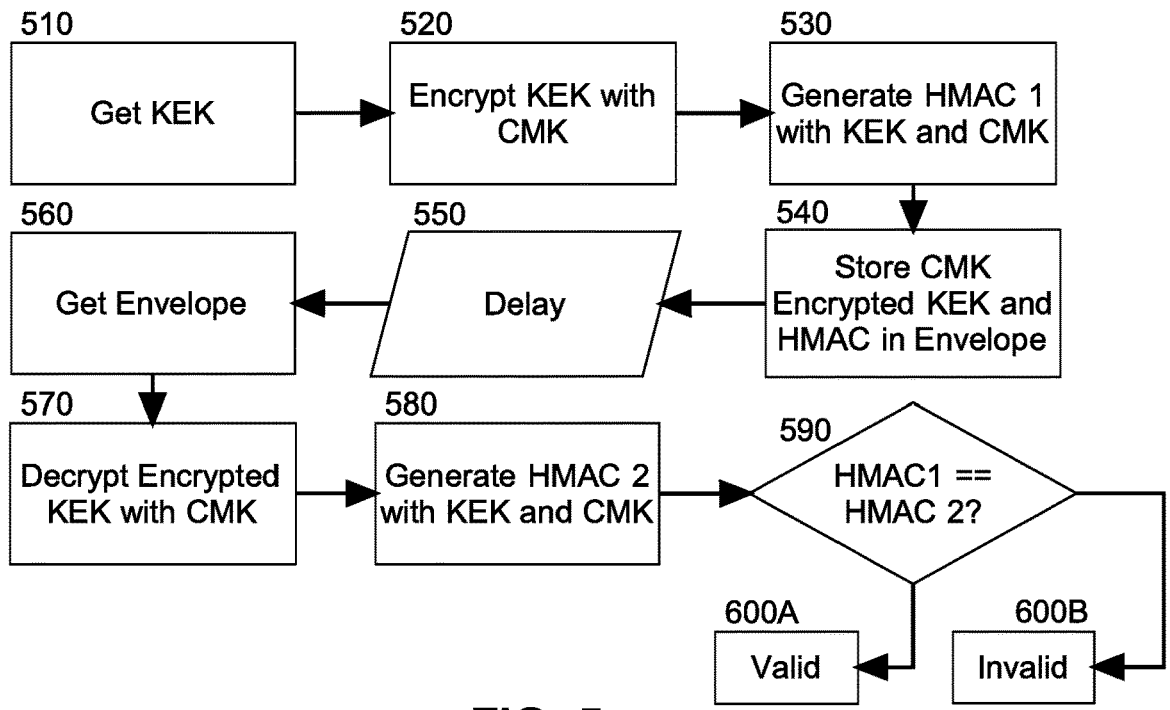

As noted, the integrity of the envelope may be assured by way of the use of an HMAC value disposed in the envelope. In further illustration, FIG. 5 is a flow chart illustrating a process for validating an enveloped KEK. Beginning in block 510 a KEK is retrieved for an instance of the computer program during the encryption process and in block 520, the KEK is encrypted with the CMK of the instance. Then, in block 530 a first HMAC is created with the KEK and the CMK and in block 540 the CMK encrypted KEK and the HMAC are stored in the envelope. In block 550, after a lapse of time during a decryption process, the envelope is received in block 560 and in block 570 the encrypted KEK is decrypted using the CMK for the instance. In block 580 a new HMAC is generated with the KEK newly decrypted and the CMK. In decision block 590, if both HMACs are equivalent, the envelope is deemed valid in block 600A. Otherwise, the envelope is deemed invalid in block 600B.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for persisting data at rest in encrypted form, the method comprising:
   receiving, in memory of a computer from over a computer communications network, by an encryption process, a customer master key for a corresponding instance of a computer program executing remotely over the computer communications network;
   transmitting, over the computer communications network by the encryption process to a key management service that is separate from the encryption process, the customer master key as part of a request for a key encryption key associated with the customer master key;
   receiving, from the key management service, in the memory of the computer, both an unencrypted form of the key encryption key and an encrypted form of the key encryption key, wherein the unencrypted form of the key encryption key is recoverable by decrypting the encrypted form of the key encryption key using the customer master key;
   storing the encrypted form of the key encryption key in a database for the computer program;
   storing the unencrypted form of the key encryption key in the memory of the computer;
   subsequently receiving from the instance of the computer program in the encryption process, unencrypted data to be stored in the database for the computer program; and
   responding to the receipt of the unencrypted data by the encryption process by:
     generating a data key using a randomly generated key;
     encrypting the data key with the unencrypted form of the key encryption key;
     encrypting the received unencrypted data with the data key;
     generating a first hash message authentication code using the unencrypted form of the key encryption key and the customer master key;
     creating an encrypted data envelope with the encrypted data key, the first hash message authentication code, and the encrypted data; and
     returning to the instance of the computer program, only the encrypted data envelope without returning the data key.

2. The method of claim 1, further comprising:
   receiving from the instance of the computer program in the encryption process, a decryption request in respect to the encrypted data envelope; and
   responding to the receipt of the encrypted data envelope by the encryption process by:
     splitting the encrypted data envelope into the encrypted data key and the encrypted data;
     retrieving the unencrypted form of the key encryption key;
     decrypting the encrypted data key with the retrieved key encryption key to produce the data key;
     decrypting the encrypted data with the data key to produce the unencrypted data; and
     returning to the instance of the computer program, the unencrypted data.

3. The method of claim 1, further comprising:
   generating a transportable backup of the database by:
     receiving from a requestor of the transportable backup, an encrypted form of a database master key;
     requesting the key management service to decrypt the encrypted form of the database master key and receiving in return, the database master key;

encrypting the key encryption key with the database master key;

storing the database master key encrypted form of the key encryption key in the database; and returning to the requestor an indication of success, the requestor creating a backup of the database including the database master key encrypted form of the key encryption key.

4. The method of claim 3, further comprising:
restoring the backup by:
receiving from a restored form of the database the database master key encrypted form of the key encryption key;

decrypting the database master key encrypted form of the key encryption key with the database master key to produce the key encryption key; and transmitting over the computer communications network by the encryption process to the key management service the customer master key as part of the request for the key encryption key and receiving in the memory of the computer in response, both the key encryption key and the encrypted form of the key encryption key by:

storing the encrypted form of the key encryption key in the database; and deleting the database master key from the memory.

5. The method of claim 1, wherein the encrypted data envelope comprises the encrypted form of the key encryption key and the first hash message authentication code generated by the key encryption key and the customer master key, so that the encrypted data envelope is validated by:

a subsequent opening of the encrypted data envelope;

decrypting the encrypted form of the key encryption key with the customer master key to produce the unencrypted form of the key encryption key;

the generation of a second hash message authentication code with the key encryption key and the customer master key; and a comparison of the first and second hash message authentication codes.

6. A data processing system adapted for persisting data at rest in encrypted form comprising:

a computer with memory and at least one processor; and an encryption process comprising computer program instructions executing in the memory performing:

receiving, from over a computer communications network, a customer master key for a corresponding instance of a computer program executing remotely over the computer communications network;

transmitting, over the computer communications network to a key management service that is separate from the encryption process, the customer master key as part of a request for a key encryption key associated with the customer master key;

receiving, from the key management service, in the memory, both an unencrypted form of the key encryption key and an encrypted form of the key encryption key, wherein the unencrypted form of the key encryption key is recoverable by decrypting the encrypted form of the key encryption key using the customer master key;

storing the encrypted form of the key encryption key in a database for the computer program;

storing the unencrypted form of the key encryption key in the memory;

subsequently receiving from the instance of the computer program in the encryption process, unencrypted data to be stored in the database for the computer program; and responding to the receipt of the unencrypted data by the encryption process by:

generating a data key using a randomly generated key;

encrypting the data key with the unencrypted form of the key encryption key;

encrypting the received unencrypted data with the data key;

generating a first hash message authentication code using the unencrypted form of the key encryption key and the customer master key;

creating an encrypted data envelope with the encrypted data key, the first hash message authentication code, and the encrypted data; and returning to the instance of the computer program, only the encrypted data envelope without returning the data key.

7. The system of claim 6, wherein the encryption process further performs:

receiving from the instance of the computer program a decryption request in respect to the encrypted data envelope; and responding to the receipt of the encrypted data envelope by:

splitting the encrypted data envelope into the encrypted data key and the encrypted data;

retrieving the unencrypted form of the key encryption key;

decrypting the encrypted data key with the retrieved key encryption key to produce the data key;

decrypting the encrypted data with the data key to produce the unencrypted data; and returning to the instance of the computer program, the unencrypted data.

8. The system of claim 6, wherein the encryption process further performs:

generating a transportable backup of the database by:
receiving from a requestor of the transportable backup, an encrypted form of a database master key;

requesting the key management service to decrypt the encrypted form of the database master key and receiving in return, the database master key;

encrypting the key encryption key with the database master key;

storing the database master key encrypted form of the key encryption key in the database; and returning to the requestor an indication of success, the requestor creating a backup of the database including the database master key encrypted form of the key encryption key.

9. The system of claim 8, wherein the encryption process further performs:

restoring the backup by:
receiving from a restored form of the database the database master key encrypted form of the key encryption key;

decrypting the database master key encrypted form of the key encryption key with the database master key to produce the key encryption key; and transmitting over the computer communications network by the encryption process to the key management service the customer master key as part of the request for the key encryption key and receiving in the memory of the computer in response, both the key encryption key and the encrypted form of the key encryption key by:
storing the encrypted form of the key encryption key in the database; and
deleting the database master key from the memory.

10. The system of claim 6, wherein the encrypted data envelope comprises the encrypted form of the key encryption key and the first hash message authentication code generated by the key encryption key and the customer master key, so that the encrypted data envelope is validated by:
a subsequent opening of the encrypted data envelope;
decrypting the encrypted form of the key encryption key with the customer master key to produce the unencrypted form of the key encryption key;
the generation of a second hash message authentication code with the unencrypted form of the key encryption key and the customer master key; and
a comparison of the first and second hash message authentication codes.

11. A computer program product for persisting data at rest in encrypted form, the computer program product including a non-transitory computer readable storage medium having program instructions embodied therewith, the program instructions executable by a device to cause the device to perform a method including:
receiving in memory of a computer from over a computer communications network, by an encryption process, a customer master key for a corresponding instance of a computer program executing remotely over the computer communications network;
transmitting over the computer communications network by the encryption process to a key management service that is separate from the encryption process, the customer master key as part of a request for a key encryption key associated with the customer master key;
receiving, from the key management service, in the memory of the computer, both an unencrypted form of the key encryption key and an encrypted form of the key encryption key, wherein the unencrypted form of the key encryption key is recoverable by decrypting the encrypted form of the key encryption key using the customer master key;
storing the encrypted form of the key encryption key in a database for the computer program;
storing the unencrypted form of the key encryption key in the memory;
subsequently receiving from the instance of the computer program in the encryption process, unencrypted data to be stored in the database for the computer program; and
responding to the receipt of the unencrypted data by the encryption process by:
generating a data key using a randomly generated key;
encrypting the data key with the unencrypted form of the key encryption key;
encrypting the received unencrypted data with the data key;
generating a first hash message authentication code using the unencrypted form of the key encryption key and the customer master key;
creating an encrypted data envelope with the encrypted data key, the first hash message authentication code, and the encrypted data; and
returning to the instance of the computer program, only the encrypted data envelope without returning the data key.

12. The computer program product of claim 11, wherein the device further performs:
receiving from the instance of the computer program in the encryption process, a decryption request in respect to the encrypted data envelope; and
responding to the receipt of the encrypted data envelope by the encryption process by:
splitting the encrypted data envelope into the encrypted data key and the encrypted data;
retrieving the unencrypted form of the key encryption key;
decrypting the encrypted data key with the retrieved key encryption key to produce the data key;
decrypting the encrypted data with the data key to produce the unencrypted data; and
returning to the instance of the computer program, the unencrypted data.

13. The computer program product of claim 11, wherein the device further performs:
generating a transportable backup of the database by:
receiving from a requestor of the transportable backup, an encrypted form of a database master key;
requesting the key management service to decrypt the encrypted form of the database master key and receiving in return, the database master key;
encrypting the key encryption key with the database master key;
storing the database master key encrypted form of the key encryption key in the database; and
returning to the requestor an indication of success, the requestor creating a backup of the database including the database master key encrypted form of the key encryption key.

14. The computer program product of claim 13, wherein the device further performs:
restoring the backup by:
receiving from a restored form of the database the database master key encrypted form of the key encryption key;
decrypting the database master key encrypted form of the key encryption key with the database master key to produce the key encryption key; and
transmitting over the computer communications network by the encryption process to the key management service the customer master key as part of the request for the key encryption key and receiving in the memory of the computer in response, both the key encryption key and the encrypted form of the key encryption key by:
storing the encrypted form of the key encryption key in the database; and
deleting the database master key from the memory.

15. The computer program product of claim 11, wherein the encrypted data envelope comprises the encrypted form of the key encryption key and the first hash message authentication code generated by the key encryption key and the customer master key, so that the encrypted data envelope is validated by:
a subsequent opening of the encrypted data envelope;
decrypting the encrypted form of the key encryption key with the customer master key to produce the unencrypted form of the key encryption key;

the generation of a second hash message authentication code with the unencrypted form of the key encryption key and the customer master key; and a comparison of the first and second hash message authentication codes.

* * * * *